United States Patent [19]
Buckreuss et al.

[11] Patent Number: 6,028,549
[45] Date of Patent: Feb. 22, 2000

[54] PROCESS FOR THE DETECTION AND SUPPRESSION OF INTERFERING SIGNALS IN S.A.R. DATA AND DEVICE FOR PERFORMING THIS PROCESS

[75] Inventors: Stefan Buckreuss, München; Thomas Sutor, Freising, both of Germany

[73] Assignee: Deutsches Zentrum fur Luft-und Raumfahrt E.V., Bonn, Germany

[21] Appl. No.: 09/316,380

[22] Filed: May 21, 1999

[30] Foreign Application Priority Data

May 22, 1998 [DE] Germany .................. 198 22 957.7

[51] Int. Cl.[7] .................................................. G01S 13/90
[52] U.S. Cl. .......................................... 342/159; 162/196
[58] Field of Search ........................... 342/25, 159, 161, 342/162, 192, 195, 196, 189

[56] References Cited

U.S. PATENT DOCUMENTS

| | | | |
|---|---|---|---|
| 5,111,823 | 5/1992 | Cohen | 600/443 |
| 5,383,457 | 1/1995 | Cohen | 600/443 |
| 5,546,085 | 8/1996 | Garnaat et al. | 342/25 |
| 5,969,662 | 10/1999 | Hellsten | 342/25 |

FOREIGN PATENT DOCUMENTS 9615462  5/1996  WIPO .

OTHER PUBLICATIONS

"Interrelated problems in space–time processing for SAR and ISAR", Klemm, R., Radar, Sonar and Navigation, IEE Proceedings—vol.: 145 5, Oct. 1998, Page(s): 297–302, 1997.

"Removing RF interferences from P–band airplane SAR data", Cazzaniga, G.; Monti Guarnieri, A.,Geoscience and Remote Sensing Symposium, 1996. IGARSS'96. 'Remote Sensing for a Sustainable Future.', International vol.: 3, 1996, Page(s): 1845–1847 vol.3.

"Estimation of the SAR system transfer function through processor defocus", Vachon, P.W.; Raney, R.K,.Geoscience and Remote Sensing, IEEE Transactions on vol.: 27 6, Nov. 1989, Page(s): 702–708.

"Estimating the correlation properties of k–distributed SAR clutter", Lombardo, P.; Oliver, C.J., Radar, Sonar and Navigation, IEE Proceedings—vol.: 142 4, Aug. 1995, Page(s): 167–178.

"Three–channel Wiener filter for suppression of speckle noise in SAR images of ocean scenes", Guy, E.V.; Khan, R.H., Electrical and Computer Engineering, 1994. Conference Proceedings. 1994 Canadian Conference on, 1994, Page(s):433–436 vol.2.

"A comparison of simulation techniques for correlated gamma and K–distributed images for SAR applications", Blacknell, D.; Blake, A.; Lombardo, P.; Oliver, C.J., Geoscience and Remote Sensing Symposium, 1994. IGARSS'94. Surface and Atmospheric Remote Sens.

(List continued on next page.)

*Primary Examiner*—John B. Sotomayor
*Attorney, Agent, or Firm*—Browdy and Neimark

[57] ABSTRACT

For the detection and suppression of interfering signals in SAR data, a time-domain noisy raw data signal $\tilde{U}_T(t)$ is Fourier-transformed by range lines in raw frequency-domain spectrum $\tilde{U}_T(f)$. The resulting spectrum $\tilde{U}_T(f)$ is law-pass filtered according to a transmission-signal bandwidth $B_s$ to yield a useful spectrum $U_T(f)$ and an autocorrelation function $\widehat{ACF}(t)$ of useful spectrum $U_T(f)$ is determined in the time domain. A weighting function $w(t)$ is used to suppress portions of the useful signal in the autocorrelation function $\widehat{ACF}(t)$, thereby intensifying the interfering signal in relation to the autocorrelation function $\widehat{ACF}(t)$. The resulting signal $\widehat{ACF}(t)$ is transformed into a power spectral density $\widehat{ACF}(f)$ and a threshold value m is calculated from the power spectral density $\widehat{ACF}(f)$ with a MADMED function. A final notch filter $W_N(f)$ is generated by Fourier-transforming the ideal notch filter frequency response $W_{N\ ideal}(f)$.

2 Claims, 11 Drawing Sheets

OTHER PUBLICATIONS

"Comments on "Statistical and spatial properties of forest clutter measured with polarimetric synthetic aperture radar"", Blacknell, D.; Oliver, C.J., Geoscience and Remote Sensing, IEEE Transactions on vol.: 31 5, Sep. 1993, Page(s): 1093–1094.

"Overview of the HDL impulse synthetic aperture radar", McCorkle, J.W., Antennas and Propagation Society International Symposium, 1992. AP–S. 1992 Digest. Held in Conjuction with: URSI Radio Science Meeting and Nuclear EMP Meeting., IEEE, 1992, Page(s):.

"Statistical and spatial properties of forest clutter measured with polarimetric synthetic aperture radar (SAR)", Sheen, D.R.; Johnston, L.P., Geoscience and Remote Sensing, IEEE Transactions on vol.: 30 3, May 1992, Page(s): 578–588.

Cazzaniga et al., "Removing RF interferences from P–Band airplane SAR data.", *GARSS'96*, pp.1845–1847, (1996).

PROCESS FOR THE DETECTION AND SUPPRESSION OF INTERFERING SIGNALS IN S.A.R. DATA AND DEVICE FOR PERFORMING THIS PROCESS

FIELD OF THE INVENTION

The present invention relates to a process for the detection and suppression of interfering signals in SAR data and to a device for performing this process.

REVIEW OF THE RELATED TECHNOLOGY

Airborne radar systems with synthetic aperture radar (SAR) operating in the P-, L-, C- and X-band make it possible to image the earth's surface along the aircraft's flight path. During this process the antenna is oriented perpendicular to the flight direction in a downward-slanted direction. The image points of the resulting map represent the degree of radar reflection of the objects on the ground.

The above frequency bands, however, are not reserved exclusively for radar applications. The P-band (450 MHz) in particular, and in part also the L-band (1.3 GHz), are also used by other services like radio and television stations, as well as for telecommunication purposes. When the aircraft passes over one of these broadcasting stations, the radar also picks up the station's signals and these interfere with echo signals of the SAR system. These interferences overlay the radar information and become visible in the SAR image as bright lines perpendicular to the flight direction.

As the density of these broadcasting stations is steadily increasing in central Europe, it is becoming increasingly less likely that undisturbed SAR images can be obtained, especially with the P-band. It also is not possible to switch to other undisturbed frequency bands because the larger wavelengths (0.67 m for the P-band), in particular, offer Possibilities for new applications due to their deeper penetration into the ground. It is therefore absolutely necessary that a suitable process be found for suppressing these interferences.

The aim of all known processes for suppressing interfering signals in SAR data is to be able to distinguish the interfering signal from the received radar signal. The interfering signal can then be suppressed with a suitable filter after it has been detected. The interfering signal is in essence the carrier signal of the broadcasting station on the ground, which is usually sinusoidal and stable over time.

With these processes a frequency analysis is performed in such a way that the spectrum of a range line is calculated from the raw radar data, and narrow-band spikes are detected, which clearly stand out from the spectrum. Once it is detected, the interfering frequency can be suppressed with a band-elimination filter (notch filter.)

A frequency/time analysis of a signal, done for example with the Wigner-Ville distribution, an evolutionary spectrum, or short-term FFTs (Fast Fourier Transforms), shows the change of the spectrum over time. Since an interfering signal does not change its frequency over time and the radar signal is recorded as noise, it becomes possible to distinguish between the two signals by these methods.

However, the range spectra are very noisy and so there is a high likelihood of an erroneous detection, or, of interference signals not being recognized. A possible remedy is calculation of a mean spectrum from a larger number of adjacent range spectra, which produces a smoothed spectrum in such a way that narrow-band spikes, which are caused by the interfering signal, clearly stand out.

The shortcoming of any frequency analysis lies in the fact that it cannot always be stated with certainty whether a spike in the range spectrum was caused by an interfering signal or by a radar target with a high degree of reflection. Furthermore, the spectra are very noisy, so that it is not always possibly to clearly distinguish between a radar signal and an interfering signal. The likelihood of an erroneous detection or an unrecognized interfering signal is high with this method.

The shortcoming of the frequency/time analysis lies in the fact that the detection of interfering signals is made very difficult by the noise portions in the spectral range. A residual possibility of erroneous detections or unrecognized interfering signals remains with this method as well. Furthermore, the methods for frequency/time analysis require a large number of calculations, i.e., in many cases a large number of FFTs need to be performed per range line. This means that considerable calculation times result, depending on the size of the radar image and the operative capacity of the computer. Furthermore, all known frequency/time analysis processes also contain an uncertainty relation between the two, making detection of small amplitude interferences even more difficult.

The method of averaging the spectra of adjacent range lines has the disadvantage that a mean spectrum must be calculated, for example from a block of 2048 adjacent range lines, to obtain a smoothed spectrum. This means that the calculation of a new notch filter for suppressing the interfering signals can, in this case, take place only every 2048 range lines. As a result, a certain amount of "sluggishness" results in the filtering.

It has been found, however, that the interference can change within very short time periods, sometimes from one range line to the next. An appropriately swift adjustment of the filter to the new situation is not possible with this method. The result is an unnecessary filtering in large areas of the image.

OBJECT AND SUMMARY OF THE INVENTION

The invention therefore has as an object a method and device to improve the image quality by eliminating the interfering signals in the raw radar data.

In the process according to the invention the interfering signals are emphasized for the purpose of interference suppression, so that they can be distinguished more easily from the radar signals. This is done as follows:

(a) The autocorrelation function (ACF) of a range line of the raw radar data is calculated.

(b) The ACF of the range line is essentially the sum of the ACF of the radar signal and the ACF of the interference signal. The ACF of the broad-band radar signal is concentrated in a very small time range. The ACF of the narrow-band interference signal overlays the entire time range of the ACF. Because of these different characteristics, the ACF of the radar signal can easily be extracted with a suitable window function.

(c) The resulting filtered ACF is Fourier-transformed to obtain a power spectral densitiy (PSD) according to the Wiener-Khinchin theorem, with the result that the spikes that are caused by the interfering signals are now particularly pronounced. This process is performed with a particularly interference-resistant ACF estimator.

(d) The frequency at which the interference peaks are located in the PSD is determined, and an appropriate notch filter is calculated and applied to attenuate the interfering frequencies.

(e) The SAR image is then generated as usual.

As compared to the known processes described above, the process according to the invention has the advantage that the interfering signals can be determined with a high degree of accuracy without averaging processes, and an adjustment of the notch filter can take place with each new range line.

BRIEF DESCRIPTION OF THE DRAWING FIGURES

The invention is explained in more detail below, based on preferred embodiments and with reference to the appended drawings, in which.

Figure 7:
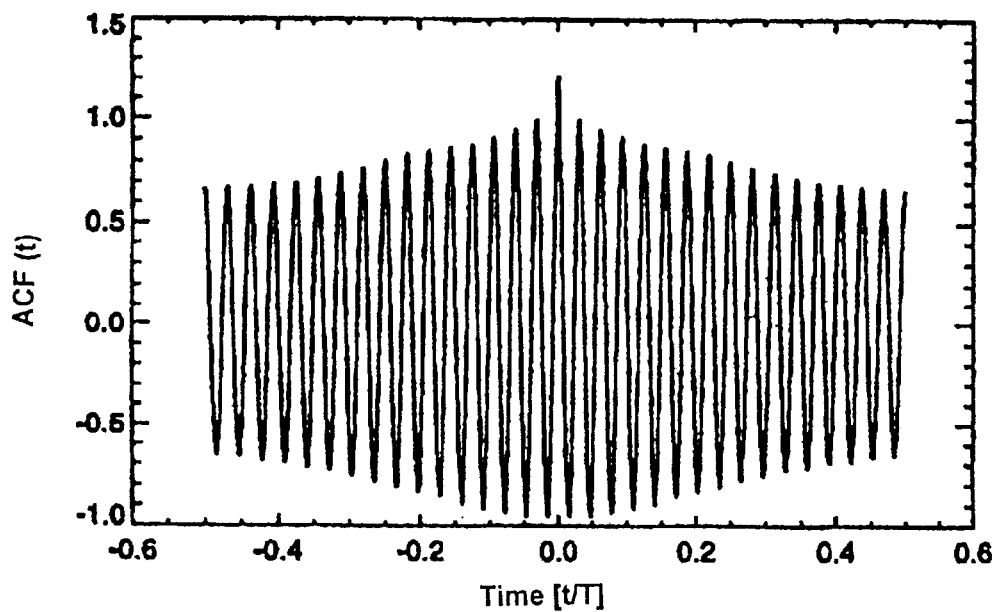
Figure 8:
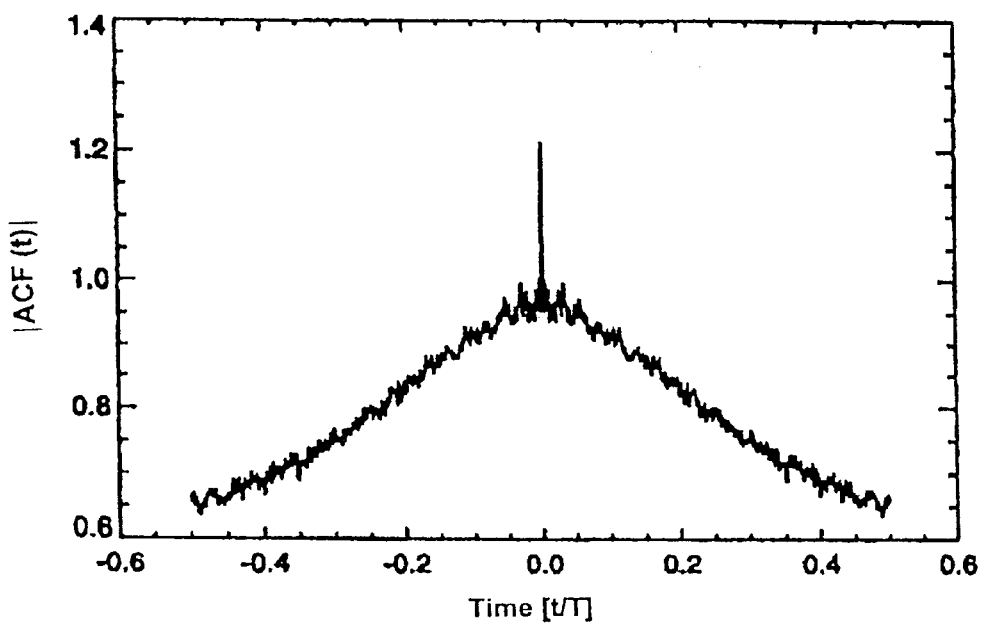
Figure 9:
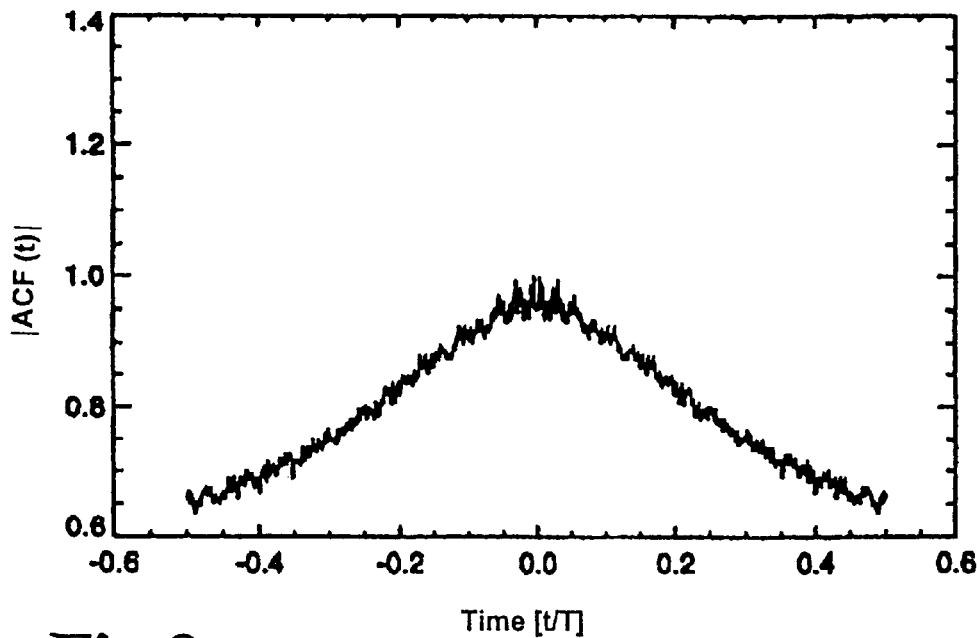
Figure 10:
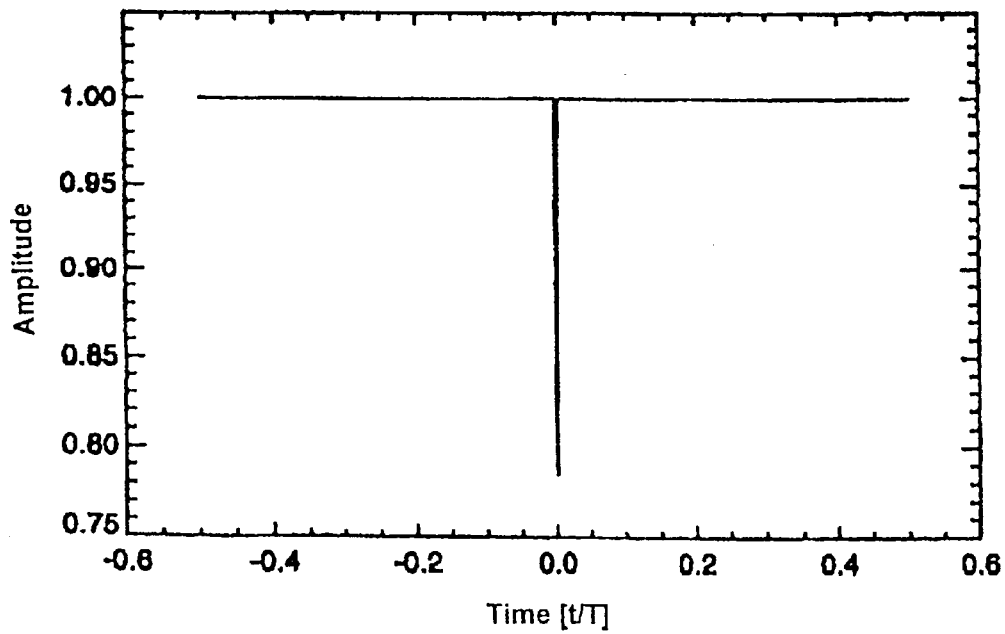
Figure 11:
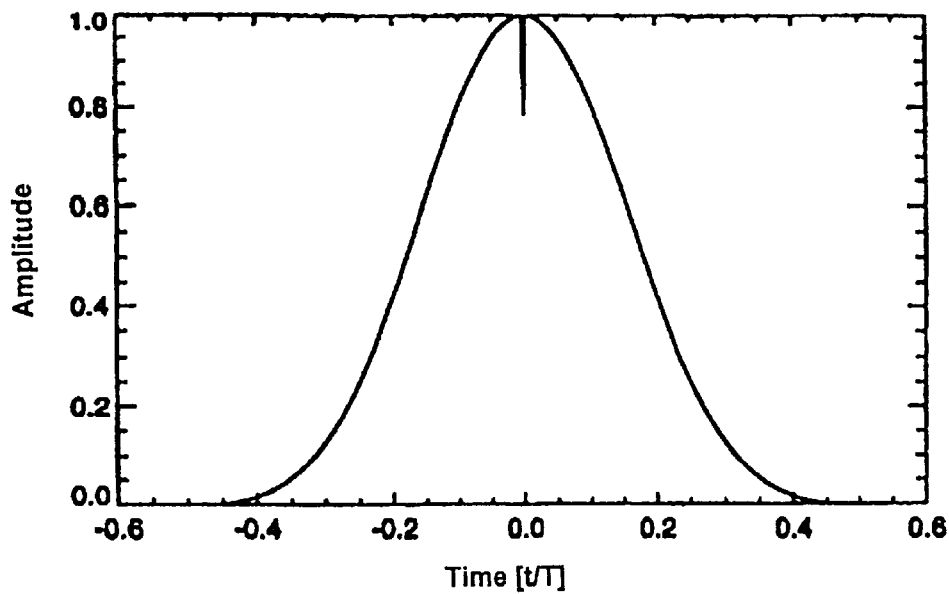
Figure 12:
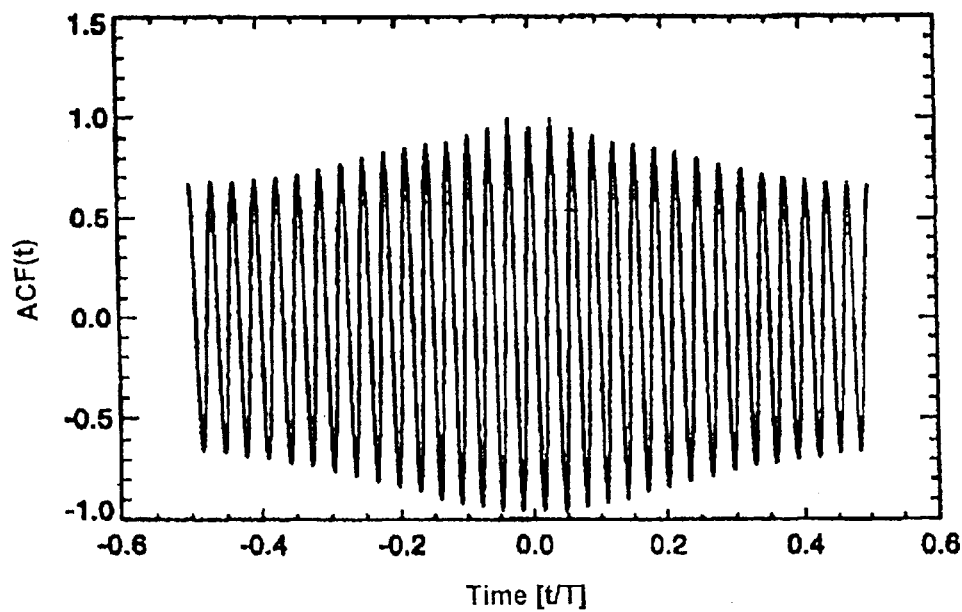
Figure 13:
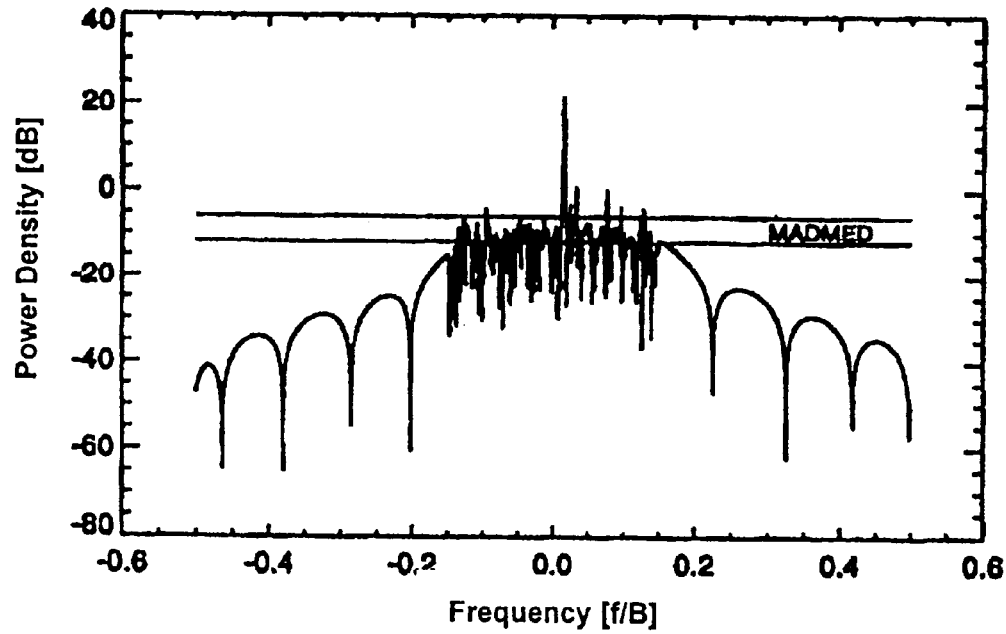
Figure 14:
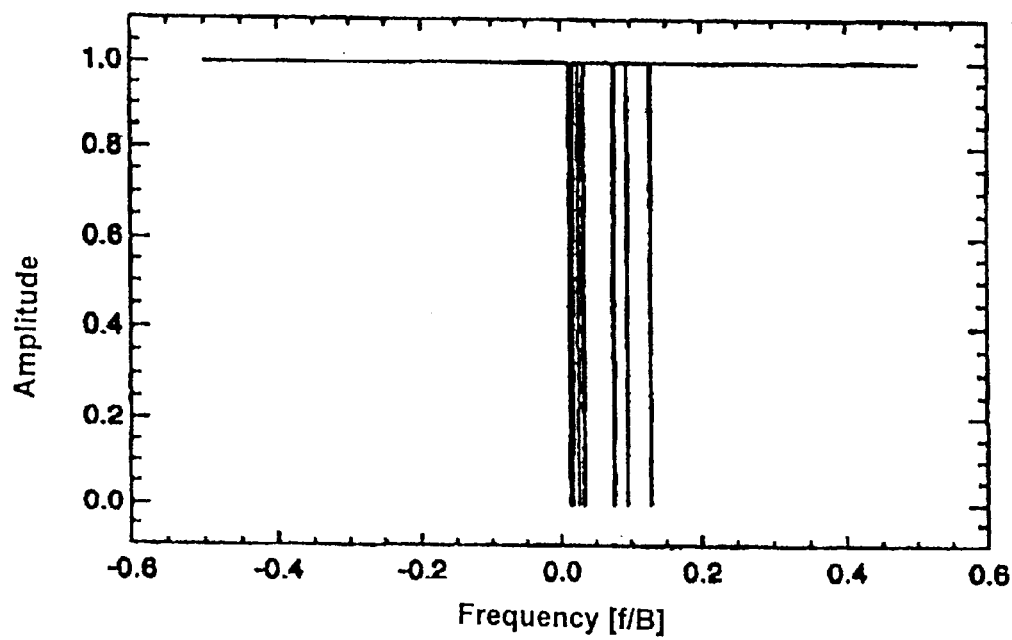
Figure 15:
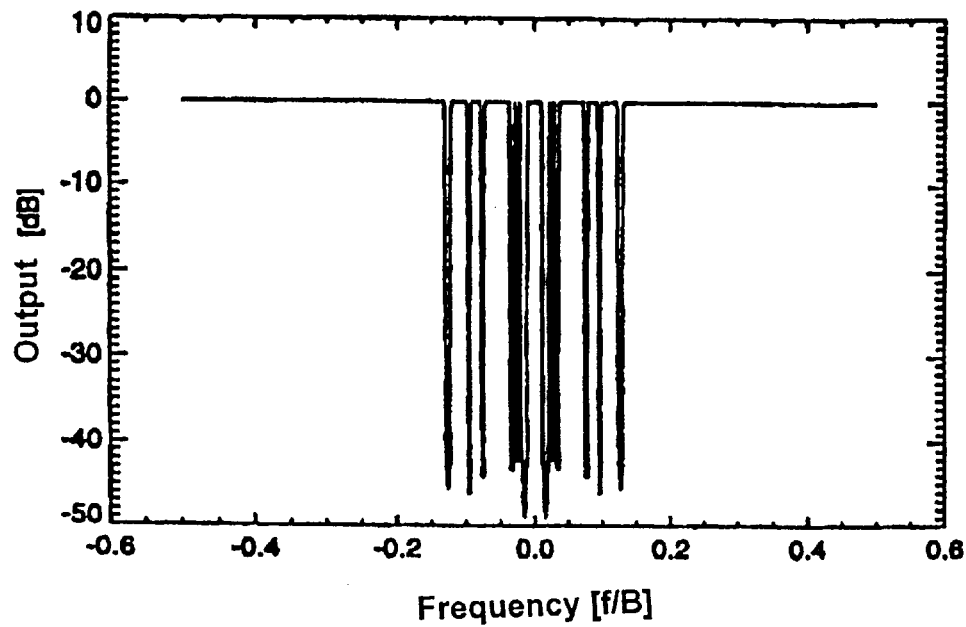
Figure 16:
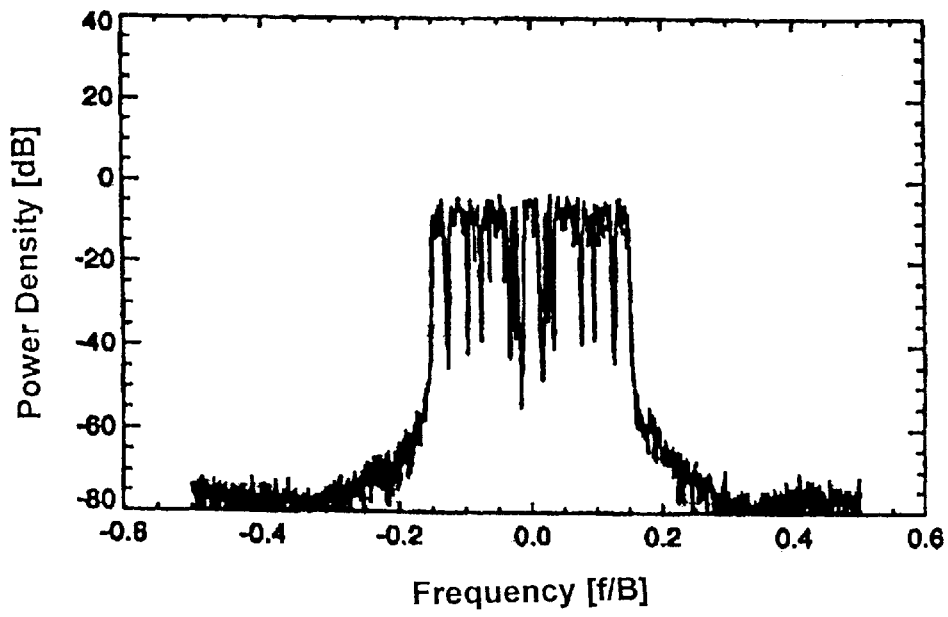

FIG. 7 graphs an autocorrelation function of a noisy -radar signal;

FIG. 8 graphs a representation of an envelope of the autocorrelation function;

FIG. 9 graphs a representation of a smoothed envelope of the autocorrelation function;

FIG. 10 graphs a representation of a quotient of the envelopes in FIGS. 8 and 9;

FIG. 11 is a graph of a Parzen window with notch;

FIG. 12 is a graph of an autocorrelation function with suppressed radar signal;

FIG. 13 is a graph of a power spectral density with a threshold value;

FIG. 14 is a graph of an exit signal of an ideal notch filter;

FIG. 15 is a graph of an exit signal of a notch filter;

FIG. 16 is a graph of a power spectral density of a filtered range line; and

Figure 17:
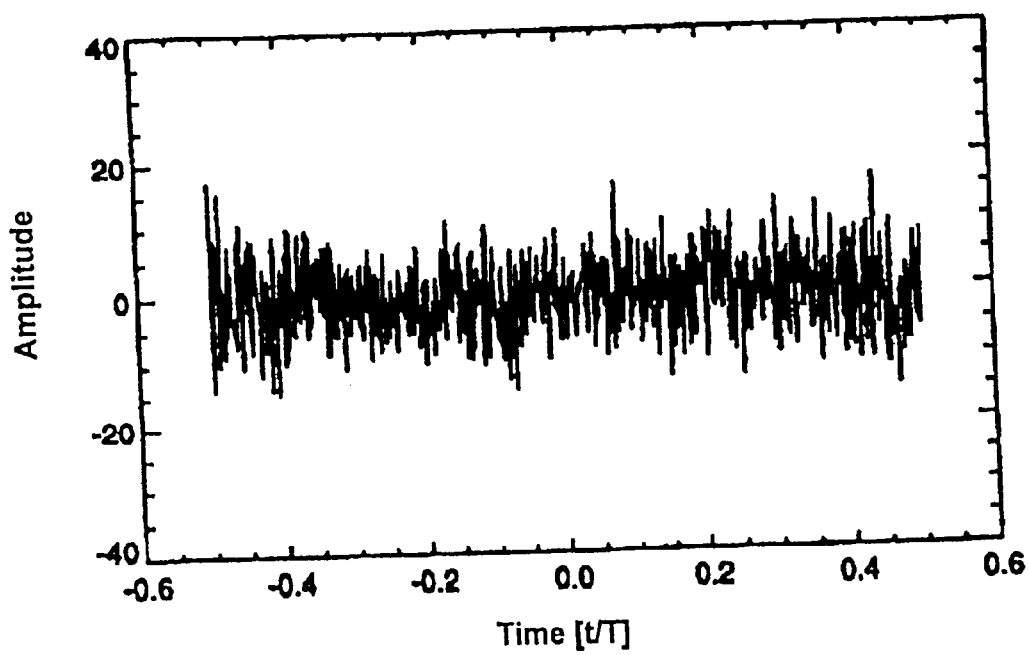

FIG. 17 is a graph of a range line filtered with a notch filter.

DETAILED DESCRIPTION OF THE PREFERRED EMBODIMENTS

Table 1 shows various quantities referred to in the discussion following:

TABLE 1

| | |
|---|---|
| A | Amplitude |
| ACF(t) | Autocorrelation function |
| $\widehat{\text{ACF}}(t)$ | Weighted, time-limited ACF |
| $\widehat{\text{ACF}}'(t)$ | Weighted, time-limited ACF of the noisy useful signal |
| ACF″(t) | Weighted, time-limited ACF of the interfering signal with cross-terms |
| $B_c$ | Chirp bandwidth |
| $B_s$ | System bandwidth |
| f, $f_o$ | Frequency |
| $\mathfrak{F}$ | Fourier transform |

TABLE 1-continued

| | |
|---|---|
| PSD(f) | Power spectral density |
| $\widehat{\text{PSD}}_U(f)$ | Weighted, time-limited ACF of the useful signal |
| $\widehat{\text{PSD}}_S(f)$ | Weighted, time-limited ACF of the interfering signal |
| $\widehat{\text{PSD}}_{US^*}(f)$ | Weighted, time-limited ACF of the first cross-term |
| $\widehat{\text{PSD}}_{U^*S}(f)$ | Weighted, time-limited ACF of the second cross-term |
| $\widehat{\text{PSD}}(f)$ | Estimated PSD |
| $\widehat{\text{PSD}}'(f)$ | Estimated PSD of the noisy useful signal |
| $\widehat{\text{PSD}}''(f)$ | Estimated PSD of the interfering signal with cross-terms |
| $\widehat{\text{PSD}}_U(f)$ | Estimated PSD of the useful signal |
| $\widehat{\text{PSD}}_s(f)$ | Estimated PSD of the interfering signal |
| $\widehat{\text{PSD}}_{us^*}(f)$ | Estimated PSD of the first cross-term |
| $\widehat{\text{PSD}}_{u^*s}(f)$ | Estimated PSD of the second cross-term |
| s (t) | Interfering signal |
| $s_T$ (t) | Time-limited interfering signal |
| S (f) | Sprectrum of the interfering signal |
| $S_T$ (f) | Spectrum of the time-limited interfering signal |
| t, τ | Time |
| T | Signal duration |
| u (t) | Useful signal |
| $u_T$ (t) | Time-limited useful signal |
| $\tilde{u}_T$ (t) | Time-limited noisy useful signal |
| $\hat{u}_T$ (t) | Time-limited filtered useful signal |
| U (f) | Spectrum of the useful signal |
| $U_T$ (f) | Spectrum of the time-limited useful signal |
| $\tilde{U}_T$ (f) | Spectrum of the time-limited noisy signal |
| $\hat{U}_T$ (f) | Spectrum of the time-limited filtered useful signal |
| w (t) | Weighting function (Parzen window with notch) |
| w' (t) | Weighting function (Notch, interim result) |
| $w_P$ (t) | Weighting function (Parzen window) |
| $w_F(t)$ | Weighting function for the notch filter |
| $w_F$ (t) | Frequency characteristics of the weighting function for the notch filter |
| $w_N$ (t) | Pulse response of the notch filter |
| $w_{N\ ideal}$ (t) | Pulse response of the ideal notch filter |
| $W_N$ (f) | Frequency characteristics of the notch filter |
| $W_{N\ ideal}$ (f) | Frequency characteristics of the ideal notch filter |
| δ | Dirac function |
| * | Convolution |
| ⊗ | Correlation |
| ○- -● | Fourier correspondence |

Figure 1:
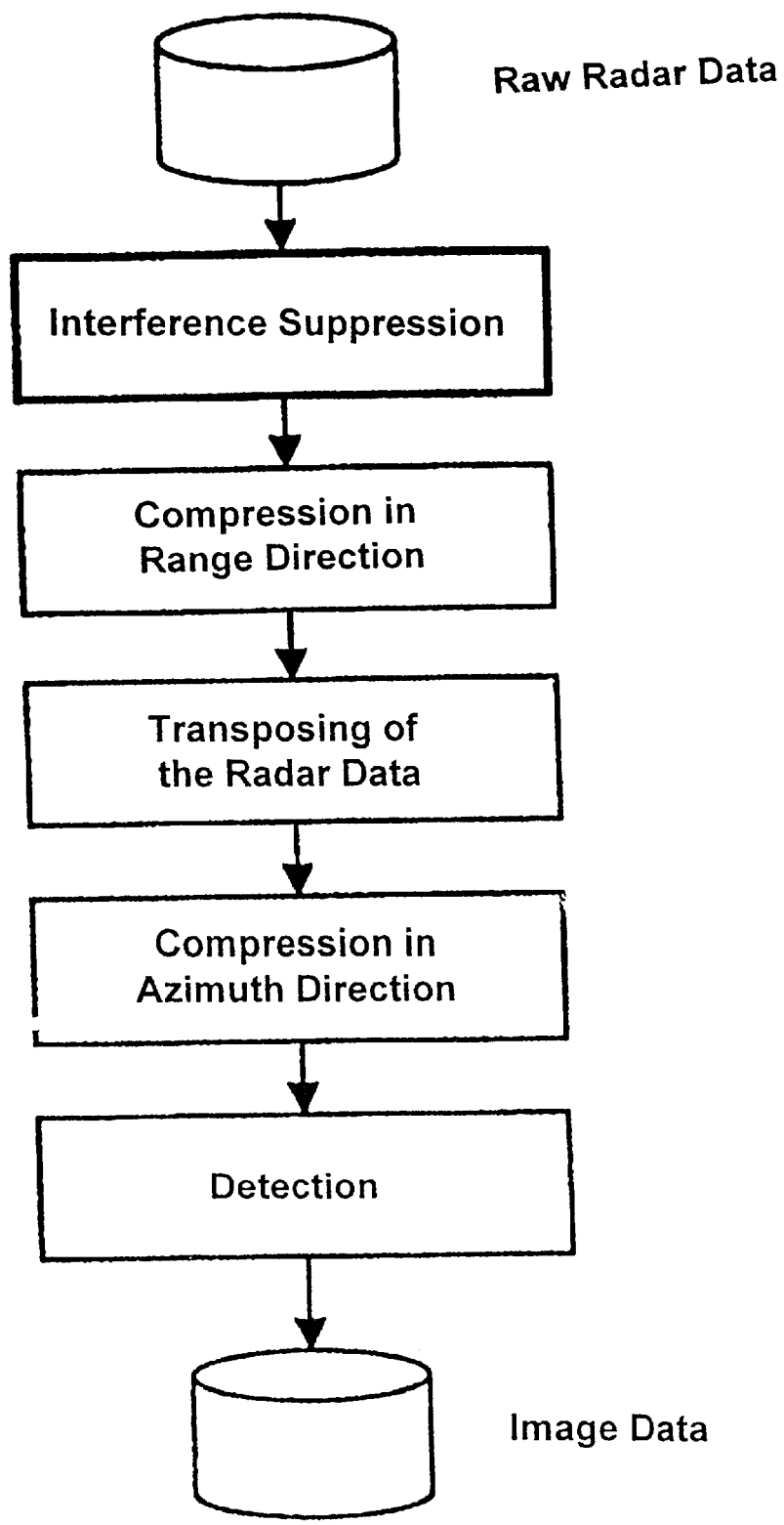
FIG. 1 is a schematic view showing the principle order of events of the radar processing with interference suppression.

The principle events of SAR processing, including the interference suppression as a first step, are shown based on a simplified range/Doppler processor in FIG. 1. Interferences that may be caused, for example, by radio and television stations and telecommunications transmitters, are suppressed before the actual SAR processing, to create equal preconditions for any subsequent processing algorithm. (FIG. 2; discussed below, shows a process for interference suppression in more detail.)

For reasons of energy efficiency, the radar transmits frequency-modulated pulses with a linear frequency modulation (chirp), which are correlated with a replica of the transmitted signal after their reception. This process is referred to as compression in range direction.

The radar data need to be transposed because of the time sequence in which the data are stored. The radar data are generated and saved by range lines. The subsequent azimuth compression, however, requires a processing of the data set by azimuth lines.

The phase characteristics of the backscatter signal are approximately square because of the change in the slant range while passing an illuminated target. Correlation of the backscatter signal with a reference function having the same phase characteristics (which can be calculated a priori) yields the pulse response in azimuth direction, or the synthesized antenna diagram, which permits the desired high azimuth resolution. This is called compression in azimuth direction.

The detection step comprises the formation of the algebraic norm of the range-compressed and azimuth-compressed data, by which a radar image with intensity values is obtained.

Figure 2:
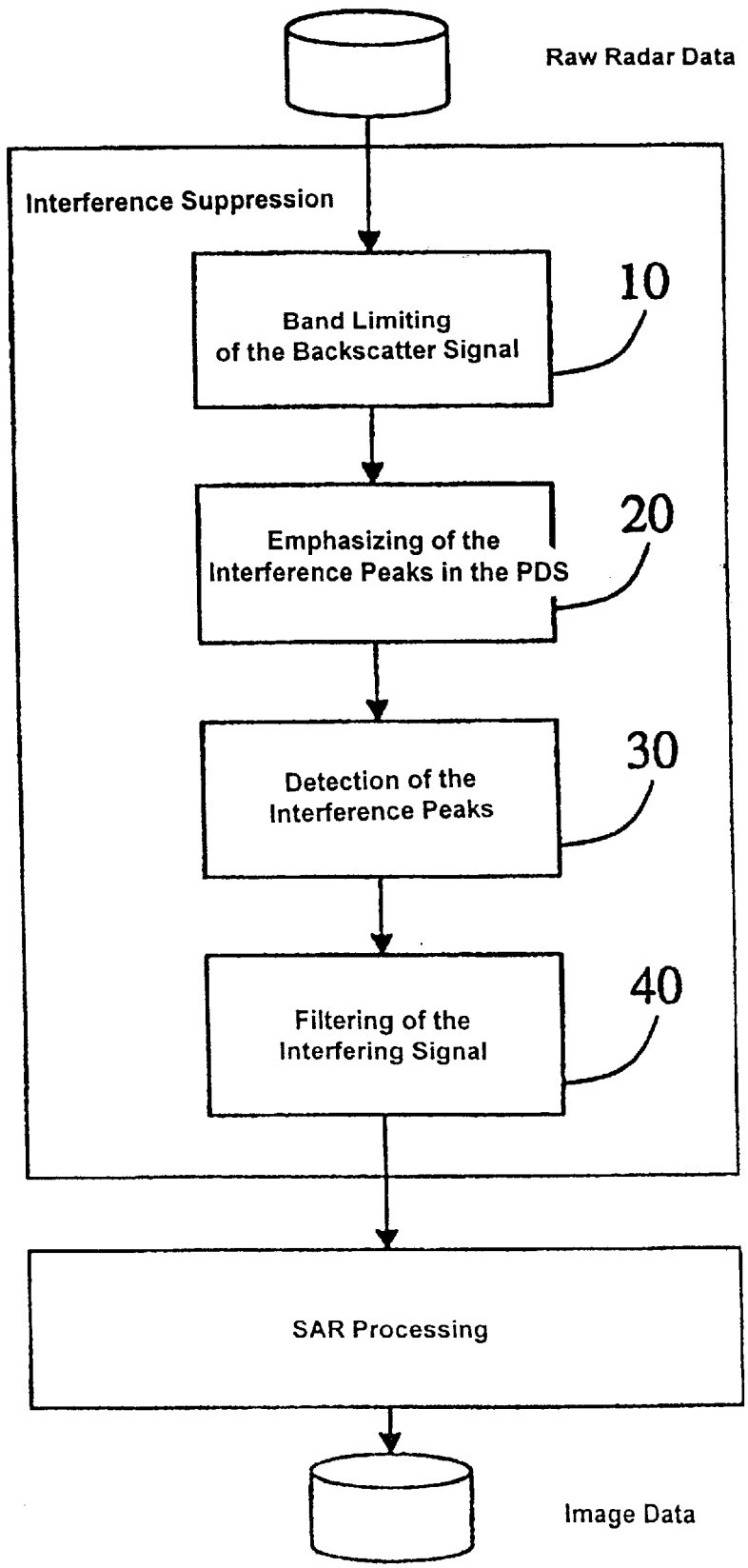
FIG. 2 is a schematic view showing the principle order of events of an interference suppression.

FIG. 2 shows four phases according to the present invention into which the interference suppression process may be divided:

1. Band limiting (10) of the backscatter signal;

2. Emphasizing of interference peaks in the power density spectrum (20) of the received signal;

3. Detection of the interference peaks (30); and

4. Filtering of the interference signal (40).

Figure 3:
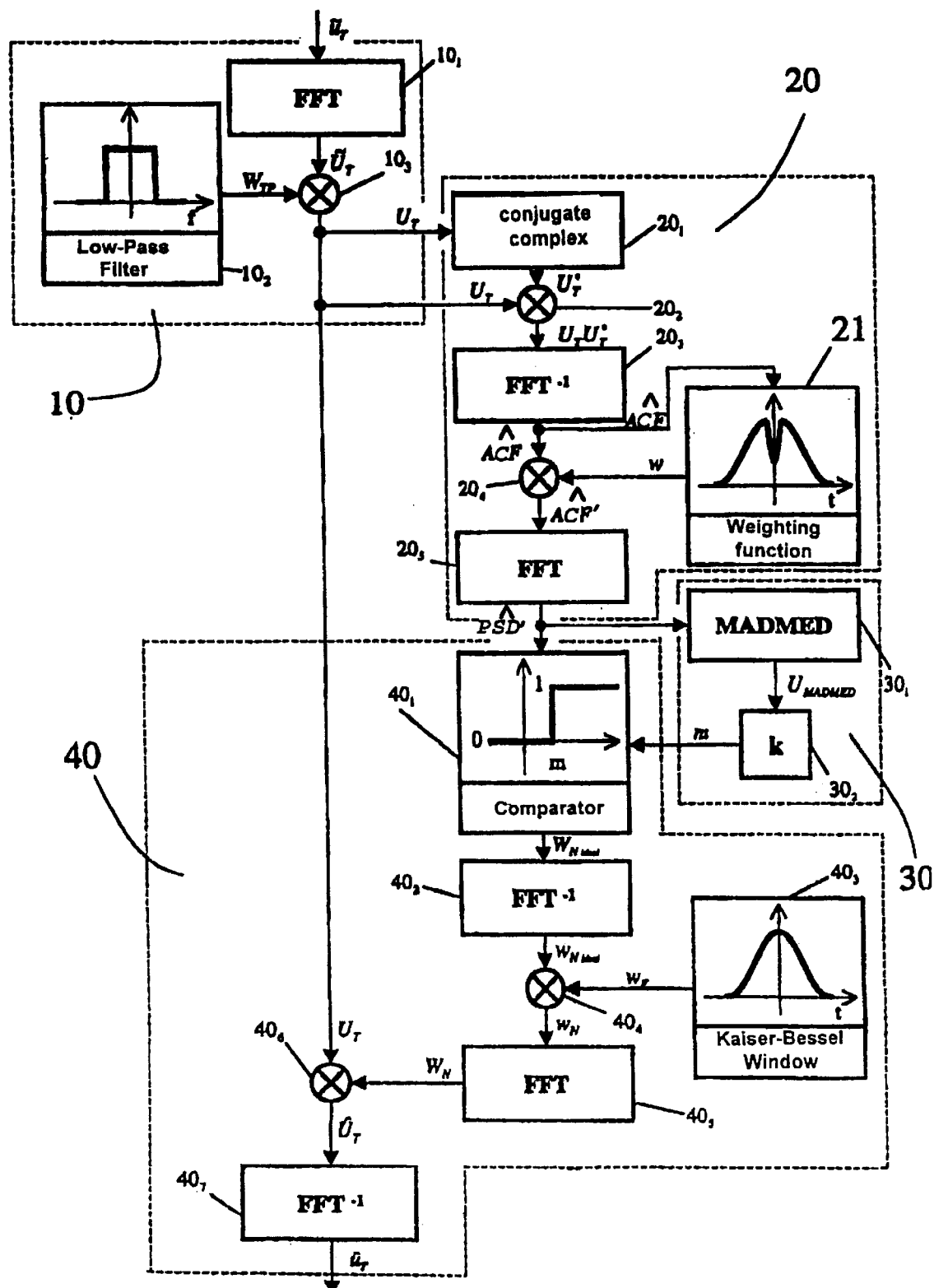
FIG. 3 is a schematic view showing a detailed order of events of an interference suppression.
Figure 4:
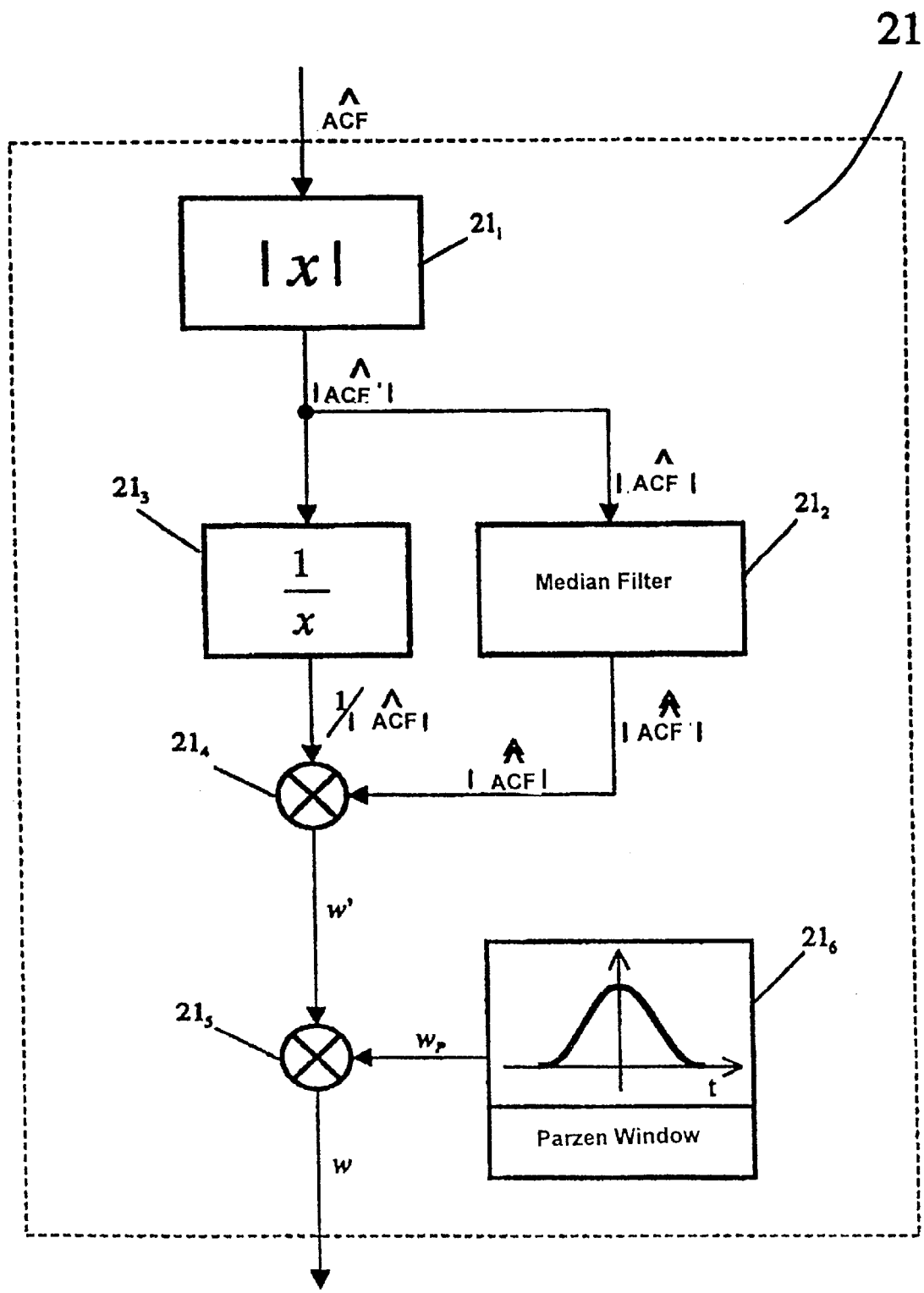
FIG. 4 is a schematic view showing a device for generating a Parzen window with notch.

FIGS. 3 and 4 relate to a more detailed description of the interference suppression, discussed below.

A first step, outlined as block 10 in FIG. 3, includes limiting the bandwidth the backscatter signal to the bandwidth $B_2$ of the transmitted signal (units $10_1$, to $10_3$) using a conventional low-pass filter $10_2$. The band-limiting or filtering section 10 suppresses interference signals outside the processed bandwidth in a simple manner according to equation (1):

$$u(t) = \overline{u}(t) * w_{LP}(t) \qquad (1)$$
$$\mathcal{F} \qquad \mathcal{F} \qquad \mathcal{F}$$
$$U(f) = \overline{U}(f) \cdot W_{LP}(f)$$

in which the upper line and the lower line represent Fourier conjugates, as indicated by the three intermediate symbols showing the Fourier correspondence between the respective terms. The upper and lower lines are functions of time and frequency, respectively, which are Fourier-conjugate quantities.

The upper line of equation (1) shows the folding ("*") of the time-limited noisy useful signal with the low-pass function of the filter $10_2$ (in the time domain) to yield the time-limited useful signal u(t), while the lower line shows the multiplication of $W_{LP}(f)$, the low-pass function (in the frequency range) of filter $10_2$, by the spectrum of the time-limited noisy signal- to yield the spectrum of the useful signal U(f).

Conversion of the time-limited noisy signal to the time-limited noisy-signal spectrum is performed with Fast Fourier Transform (box FFT) device or method $10_2$. The correlation $10_3$ takes place within the frequency domain and yields $U_T(f)$, the useful time-limited spectrum.

Ideally, $W_{LP}(f)$ is described by equation (2):

$$W_{LP}(f) = \begin{cases} 1 & |f| \leq \dfrac{B_s}{2} \\ 0 & |f| \geq \dfrac{B_s}{2} \end{cases} \qquad (2)$$

where $B_S$ is the chirp bandwidth.

Still referring to FIG. 3, section 20 (enclosed with a dashed line) relates to emphasizing the peaks caused by the interference signal (interference peaks). The present invention uses an autocorrelation function ACF(t) of the signal u(t) which is given by equation (3)

$$ACF(t) = u(t) \otimes u(t) = \int_{-\infty}^{+\infty} u(\tau) \cdot u(t+\tau) d\tau \qquad (3)$$

which is in the time domain.

The correlation can also be performed by using the Fourier transformation $\mathcal{F}$ and operating in the frequency domain. Equation (4) shows the correspondence:

$$ACF(t) = u(t) \otimes u(t) \qquad (4)$$
$$\mathcal{F} \qquad \mathcal{F} \qquad \mathcal{F}$$
$$PSD(f) = U(f) \cdot U^*(f)$$

The autocorrelation function of the already low-pass filtered radar signal is then generated with the units (devices or steps) $20_1$ through $20_3$.

In the above equation $\otimes$ denotes correlation and $\mathcal{F}$ denotes Fourier correspondence. It is apparent that the power spectral density PSD(f) of the signal u(t) can be determined based on the Wiener-Khinchin theorem via the Fourier transformation of its autocorrelation function ACF (t). The Wiener-Khinchin theorem states that Fourier transform of the autocorrelation function is the power spectral density.

In dashed-line box 20 the uppermost step or device $20_1$, labeled "complex conjugate", creates the complex conjugate of $U_T$, i.e. $U_T^*$. The correlation or multiplication of these in step or device $20_2$, together with the inverse (Fast) Fourier Transform FFT$^{*1}$ of step or device $20_3$, represents the autocorrelation function ACF(t).

In equation (3) an infinitely long duration of the signal u(t) is presupposed for determining the ACF. In practice, of course, only a finite duration T of the signal is possible. The ACF thus contains (invalid) signal portions at the start and end of the duration T which are implicitly assumed to be zero. These must accordingly be attenuated with a weighting function w(t) shown schematically in box 21 of FIG. 3 (which is also shown in FIG. 4). The Fourier transformation unit (step or device) $20_5$ generates the estimated power spectral density $\widehat{ACF}(f)$.

$$ACF(t) \cdot w_P(t) = A\widehat{C}F(t) \approx u_T(t) \otimes u_T(t) \qquad (5)$$
$$\mathcal{F} \qquad \mathcal{F} \qquad \mathcal{F}$$
$$\widehat{PSD}(f) \approx U_T(f) \cdot U_T^*(f)$$

with

-continued $$u_T(t) = u(t), \quad |t| \leq \frac{T}{2} \tag{6}$$

wherein $\widehat{ACF}(t)$ is the weighted, time-limited autocorrelation function of the time-limited signal $U_T(t)$ with the spectrum $U_T(f)$.

FIG. 4 shows the preferred weighting function, the Parzen window $21_6$ which is defined according to equation (7) as follows:

$$w_P(t) = \begin{cases} 1 - 6\left[\frac{t}{T/2}\right]^2\left[1 - \frac{|t|}{T/2}\right], & 0 \leq |t| \leq \frac{T}{4} \\ 2\left[1 - \frac{|t|}{T/2}\right]^3, & \frac{T}{4} \leq |t| \leq \frac{T}{2} \end{cases} \tag{7}$$

The Parzen window is formed by a cubic curve defined in portions, which is generated by convolving a triangle window, half the length of the Parzen window, with itself. It is constant through its third differentiation. This, in turn, ensures that the ACF forms a positive definite number series after weighting. If this were not the case, the power spectral density $\widehat{ACF}(f)$ in equation 4 might contain negative portions, which is physically impossible.

Figure 5:
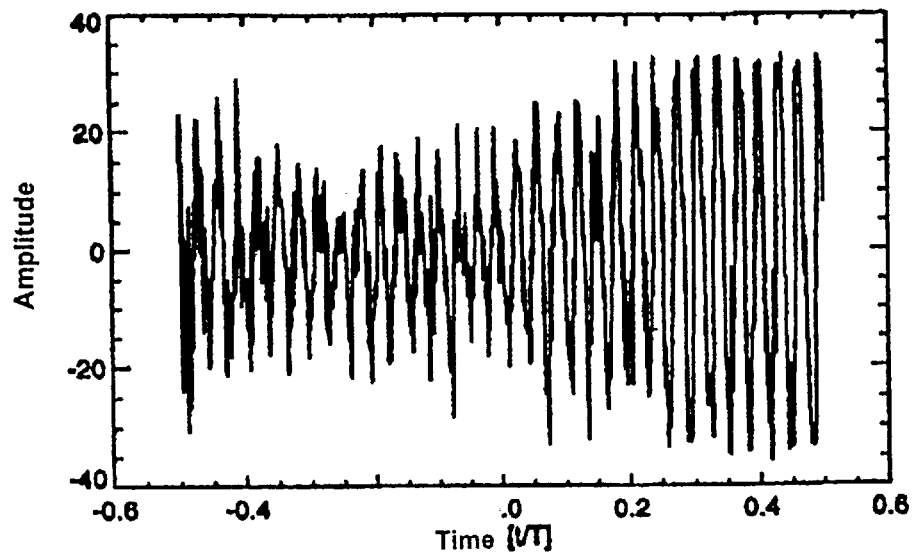
FIG. 5 is a graph showing a graph of a low-pass filtered range line.

In the following discussion let $u_T(t)$ be the radar backscatter signal of a range line overlaid by a time-limited interference signal $s_T(t)$. The "noisy" signal $\bar{U}_T(t)$, or equivalently, the corresponding spectrum $\bar{U}_T(f)$ (see FIG. 5 for an example), is defined by equation (8) with the condition of equation (9):

$$\bar{u}_T(t) = u_T(t) + s_T(t) \tag{8}$$

$$\updownarrow \mathcal{F} \quad \updownarrow \mathcal{F} \quad \updownarrow \mathcal{F}$$

$$\bar{U}_T(t) = U_T(f) + S_T(f)$$

with $$s_T(t) = s(t), \quad |t| \leq \frac{T}{2} \tag{9}$$

Figure 6:
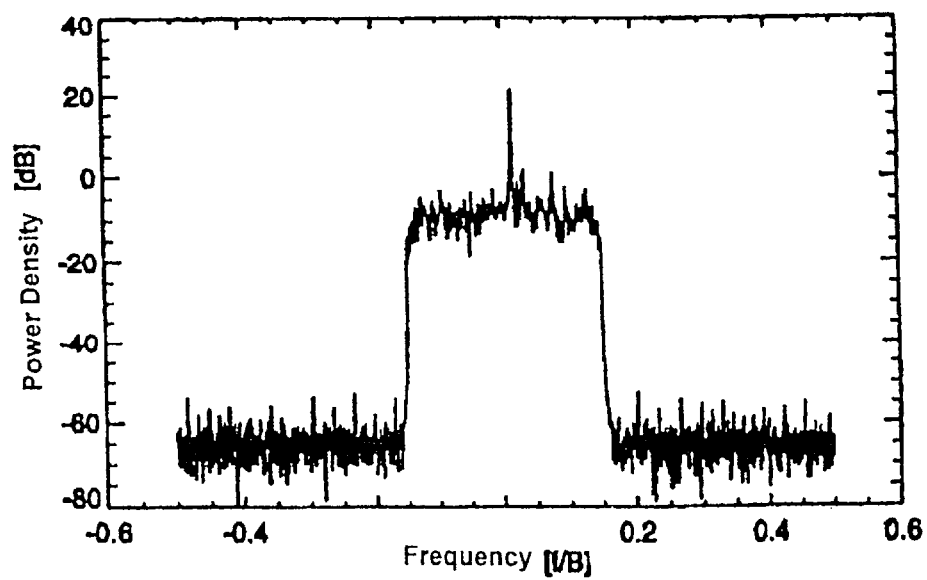
FIG. 6 is a graph of the power spectral density of the range line in FIG. 5.

Accordingly, the autocorrelation function $\widehat{ACF}$ (see FIG. 7) and the power spectral density $\widehat{ACF}$ (see FIG. 6) are obtained according to equation (10):

$$A\hat{C}F'(t) \approx [u_T(t) + s_T(t)] \otimes [u_T(t) + s_T(t)] \tag{10}$$

$$\updownarrow \mathcal{F} \quad \updownarrow \mathcal{F} \quad \updownarrow \mathcal{F}$$

$$P\hat{S}D'(f) \approx [U_T(f) + S_T(f)] \cdot [U_T^*(f) + S_T^*(f)]$$

The contributions of the signal $u_T(t)$ and the interference signal $s_T(t)$ to PSD'; and ACF';, according to equation (11), result as:

$$P\hat{S}D' \approx U_T U_T^* + S_T S_T^* + U_T^* S_T + S_T S_T^* \tag{11}$$

$$P\hat{S}D' \approx P\hat{S}D_U + P\hat{S}D_{US^*} + P\hat{S}D_{U^*S} + P\hat{S}D_S$$

$$\updownarrow \mathcal{F} \quad \updownarrow \mathcal{F} \quad \updownarrow \mathcal{F} \quad \updownarrow \mathcal{F} \quad \updownarrow \mathcal{F}$$

$$A\hat{C}F' \approx A\hat{C}F_U + A\hat{C}F_{US^*} + A\hat{C}F_{U^*S} + A\hat{C}F_S$$

with $\widehat{ACF}$ composed of the PDS of the signal $\widehat{ACF}$ and the interference signal $\widehat{ACF}$ as well as cross-terms. This applies analogously for the autocorrelation function $\widehat{ACF}$.

The interference signal and the useful signal now must be separated for the subsequent suppression of the interference signal. This is possible especially if the two signals have highly different bandwidths. In the case of the SAR, for example, the bandwidth of the useful signal is in the range of 20 MHZ to 100 MHZ. In the case of the interfering signal, on the other hand, tie dominant signal is the carrier signal from a transmitter station. It can therefore be considered sinusoidal or highly narrow-band.

(The width of the transmitter band depends on the type of modulation (amplitude-, frequency-, or phase-modulated), the degree of modulation, and the modulating frequency, as is well-known from radio theory.)

In the following discussion, the PSD of the useful signal $\widehat{ACF}$ is observed in a simplified manner as a band-limited white noise of the variance $\sigma^2$. The band limiting in this scenario results from the bandwidth of the radar system $B_R$. Approximate its ACF by a Dirac function $\delta(f)$ (a "spike" function). Then the following applies according to equation (12)

$$P\hat{S}D_U(f) \approx \frac{\sigma^2}{B_R}, \quad |f| \leq \frac{B_R}{2} \tag{12}$$

$$\updownarrow \mathcal{F} \quad \updownarrow \mathcal{F}$$

$$A\hat{C}F_U(t) \approx \frac{\sigma^2}{B_R} \cdot \delta(t)$$

Let the interfering signal be cosinusoidal $s_T(t) = A\cos(2\pi f_0 t)$ with the amplitude A and the $f_0$ $$P\hat{S}D_S(f) \approx \frac{A^2}{4}[\delta(f + f_0) + \delta(f - f_0)] \tag{13}$$

$$\updownarrow \mathcal{F} \quad \updownarrow \mathcal{F}$$

$$A\hat{C}F_S(t) \approx \frac{A^2}{2}\cos(2\pi f_0 t)$$

As is apparent, the autocorrelation function of the useful signal $\widehat{ACF}$ spans a very small time range, whereas the autocorrelation function of the interfering signal $\widehat{ACF}$ extends is across the entire time range.

(The Fourier transform of a spike is a broadband signal. For example, the Fourier transform of a Dirac delta function in time, i.e. one instant of time, is a continuous spectrum. In relation to the present invention, a spike in the frequency domain (a transmitting station) conversely has a very broad Fourier transform in the time domain.)

This characteristic is subsequently utilized to separate the two functions. The autocorrelation function of the useful signal $\widehat{ACF}$ shows itself as a peak set on top of the autocorrelation function of the interfering signal (see FIG. 7).

For this purpose the narrow range along which $ACF_u$ extends is weighted in such a way so that the $\widehat{ACF}$ is completely suppressed. The required weighting function w'(c) is calculated from the envelope or from the value of the ACF ot the noisy signal $|\widehat{ACF}|$ (see FIG. 8) as follows with the units $21_1$, $21_2$, $21_3$ and $21_4$ shown in FIG. 4:

$$w'(t) = \frac{|A\hat{\hat{C}}F|}{|A\hat{C}F|}. \quad (14)$$

Here $|\widehat{ACF}|$ (see FIG. 10) designates the smoothed envelope of $\widehat{ACF}$. In the envelope $|\widehat{ACF}|$ the radar signal also clearly stands out as a peak at f=0.

(The flat value at Amplitude=1.0 in FIG. 10 results from multiplication by the inverse, $\{1/|\widehat{ACF}|\}$, as discussed below.)

The smoothed envelope $|\widehat{ACF}|$ is obtained via a median filtering (unit $21_2$, FIG. 4). A median filter is generally used whenever individual peaks are to be removed in a signal.

The weighting operation, in unit $21_4$, of the ACF of the noisy signal $\widehat{ACF}$, with the inverted $\{1/|\widehat{ACF}|\}$ from the unit (step or device) $21_3$, suppresses the small range along which $\widehat{ACF}$ extends, and attenuates the peak. However, it also raises the beginning and end ranges of $\widehat{ACF}$, which is invalid. This is corrected by the subsequent weighting with the smoothed envelope $|\widehat{ACF}|$ (see FIGS. 10 and 12). The ACF which is then obtained is subsequently weighted (in unit $21_5$) with a Parzen window which is generated in unit $21_6$ to further attenuate the (invalid) beginning and end ranges. The resulting ACF with suppressed radar signal $\widehat{ACF}$ now results as $$\widehat{ACF}(t) = \widehat{ACF}(t) \cdot w'(t) \cdot w_p(t) \quad (15)$$

where $w_p(t)$ is preferably a weighting according to the Parzen window, and $w'(t)$ is the weighting calculated from the envelope or from the value of the ACF of the noisy signal. The weighting in unit $21_5$ of $\widehat{ACF}$ (see FIG. 12) employs the total window function $w(t)$, $$w(t) = w'(t) \cdot w_p(t) \quad (16)$$

which ideally results in the complete extenuation of $\widehat{ACF}$. What remains are $\widehat{ACF}$ and the cross-terms.

A Fourier transform (from the time domain into the frequency domain) then yields the power spectral density $\widehat{ACF}$ in which the peaks caused by the interfering signal stand out particularly well from the useful spectrum $\widehat{ACF}$ and can thus be easily detected (see FIG. 13). For $\widehat{ACF} \cong 0$:

$$A\hat{C}F' \cdot w(t) \approx A\hat{C}F'' \approx A\hat{C}F_{US^*} + A\hat{C}F_{U^*S} + A\hat{C}F_S \quad (17)$$

$$\updownarrow \mathcal{F} \quad \updownarrow \mathcal{F} \quad \updownarrow \mathcal{F} \quad \updownarrow \mathcal{F}$$

$$P\hat{S}D'' \approx P\hat{S}D_{US^*} + P\hat{S}D_{U^*S} + P\hat{S}D_S$$

$$P\hat{S}D'' \approx U_T S_T^* + U_T^* S_T + S_T S_T^*$$

where $\widehat{ACF}$ is the power density spectrum of the received signal for a range line in which the useful signal has been suppressed or in which the interfering signal has been emphasized.

One now needs to clarify to which extent the cross-terms contained in $\widehat{ACF}$ influence the subsequent detection of the interfering peaks. Based on the above example according to equations (12) and (13), the following is obtained with equation (17):

$$P\hat{S}D'' \approx U_T S_T^* + U_T^* S_T + S_T S_T^* \quad (18)$$

$$P\hat{S}D'' \approx \frac{A^2}{4}[U_T(f+f_0) + U_T(f-f_0)] + \frac{A^2}{4}[U_T(f+f_0) + U_T(f-f_0)] + P\hat{S}D_S$$

$$\updownarrow \mathcal{F} \quad \updownarrow \mathcal{F} \quad \updownarrow \mathcal{F} \quad \updownarrow \mathcal{F}$$

$$A\hat{C}F'' \approx \frac{A^2}{4}U_T(f_0)\cos(2\pi f_0 t) + \frac{A^2}{4}U_T(f_0)\cos(2\pi f_0 t) + \frac{A^2}{2}\cos(2\pi f_0 t)$$

As is apparent, the narrow-band cross-terms $U_T S_T$ and $U^*_T S_T$ extract the largest portion of the spectrum of the useful signal $U_T(f)$. This means that the PSD of the cross-terms is as narrow-band as the PSD of the interfering signal. It comprises the same frequency range and is weighted only through the spectrum of the useful signal $U_T(f)$ according to equation (19)

$$P\hat{S}D'' \approx \frac{A^2}{2}[\delta(f+f_0) + \delta(f-f_0)] + \frac{A^2}{2}[U_T(f+f_0) + U_T(f-f_0)] \quad (19)$$

$$\updownarrow \mathcal{F} \quad \updownarrow \mathcal{F}$$

$$A\hat{C}F'' \approx \frac{A^2}{2}[1 + U_T(f_0)]\cos(2\pi f_0 t)$$

No new spectral portions result, but the spectral portions of the interfering signal are overlaid by the portions of the cross-terms. The detection of the interfering signal is thus not impeded.

After the interference portions have been emphasized in the spectral density function with the above-described process, they must be detected units $30_1$ and $30_2$ (FIG. 3) in a further step, and the notch filter that will be applied must be adjusted accordingly. As mentioned, the decision threshold is subject to heavy fluctuations between the individual range lines, whose energy or variance is used as a criterion.

From the pertinent statistical literature it is known, however, that all conventional variance estimators react very sensitively to values that deviate from the mean of the observations. This means that the criterion for identifying the interference peaks is destabilized by exactly these peaks. To resolve this conflict, methods may be used that are based on robust estimates.

Robust estimating processes transfer the optimality characteristics of the least-squares method, which only apply when certain conditions are met, to the environment of these conditions. This includes, for example, the contamination of a data set by outliers. The present application can be considered as exactly such a case. In the present case the variance of the power density spectrum as the decision criterion is determined in a robust estimate with the Hampel MADMED (Median Absolute Deviation from Median) variance estimator (unit $30_1$) according to equation (20):

$$\text{MADMED}(x) = \frac{1}{0.6745} \text{median}[|x - \text{median}(x)|] \quad (20)$$

where median (x) is the median function.

Furthermore, only that range of the spectrum is evaluated which is inside the bandwidth of the transmitter signal $B_s$. This means $$U_{MADMED} = \frac{1}{0.6745} \text{median}\{ | U_T(f) - \text{median}[U_T(f)] | \}, \quad (21)$$

$$\frac{-B_S}{2} \le f \le \frac{B_S}{2}$$

A refinement of this approach could consist of a robust estimate of a polynom (polynomial) of a suitable degree and subsequent weighting of the resulting residues or observation weights.

To suppress the interfering signal, an ideal notch filter is generated in a first step, which is set to one in the pass range and to zero in the stop band. The pass range and stop bands are obtained from the above described detection of the interference peaks. If the result of equation (20) is evaluated with an empirically determined constant k (unit $30_2$), the threshold value m (see FIG. 13) is obtained, below which all values are detected as interference peaks, i.e., $$m = k \cdot U_{MADMED} \quad (22).$$

All values that are greater than m are now set to zero, all values that are less than m are set to one. This is done with a comparator $40_1$.

The notch filter is obtained based on the following correlation (FIG. 14):

$$W_{N_{ideal}}(f) = \frac{1}{2}[1 + \text{signum}(U_T(f) - m)] \quad (23)$$

To suppress overshoots of the filter's pulse response, the pulse response of the ideal notch filter is weighted with the function $w_F(t)$. Particularly suitable for this purpose is the Kaiser-Bessel window (unit $40_3$). According to equation (24), the following correlation results:

$$w_N(t) = w_{N_{ideal}}(t) \cdot w_F(t) \quad (24)$$

$$\updownarrow \mathcal{F} \quad \updownarrow \mathcal{F} \quad \updownarrow \mathcal{F}$$

$$W_N(f) = W_{N_{ideal}}(f) * W_F(f)$$

where * is convolving, $w_N(t)$ is the weighted pulse response of the filter, and $W_N(f)$ are the corresponding frequency characteristics (FIG. 15). Equation (24) is implemented with the units $40_2$ through $40_5$. Through multiplication of the noisy spectrum $U_T(f) + S_T(f)$ the approximately noise-free spectrum $\hat{U}_T(f)$ or the noise-free range line $U_T(t)$ for the further SAR processing is obtained.

$$\hat{u}_T(t) \approx w_N(t) * \bar{u}_T(t) \quad (25)$$

$$\updownarrow \mathcal{F} \quad \updownarrow \mathcal{F} \quad \updownarrow \mathcal{F}$$

$$\hat{U}_T(f) \approx W_N(f) \cdot \bar{U}_T(f)$$

Equation 25 is implemented with the units $40_6$ and $40_7$. For the Kaiser-Bessler window, which is generated in unit $40_8$, the following definition applies according to equation (26):

$$w_F(t) = \frac{I_0\left[\pi a \sqrt{1 - \left(\frac{1}{T/2}\right)^2}\right]}{I_0(\pi a)}; \quad 0 \le |t| \le \frac{T}{2}$$

with $$I_0(X) = \sum_{k=0}^{\infty} \left[\frac{R^k}{\frac{2}{k!}}\right]^2$$

The described process is performed for each range line in such a way that the filtering of the interfering portions is adapted to the respective current conditions. Any unnecessary filtering is prevented in this manner.

The process can be used whenever narrow-band signals need to be separated from broad-band signals. It can, for example, also be used in the opposite case, if a sinusoidal signal needs to be extracted from noise.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means and materials for carrying out various disclosed functions may take a variety of alternative forms without departing from the invention.

Thus the expressions "means to . . . " and "means for . . . " as may be found in the specification above and/or in the claims below, followed by a functional statement, are intended to define and cover whatever structural, physical, chemical or electrical element or structure may now or in the future exist which carries out the recited function, whether or not precisely equivalent to the embodiment or embodiments disclosed in the specification above; and it is intended that such expressions be given their broadest interpretation.

What is claimed is:

1. A process for the detection and suppression of an interfering signal in SAR data, comprising:

Fourier-transforming a time-domain noisy raw data signal $\tilde{U}_T(t)$ by range lines, into a raw frequency-domain spectrum $\tilde{U}_T(f)$;

low-pass filtering the raw frequency-domain spectrum $\tilde{U}_T(f)$, according to a transmission-signal bandwidth $B_s$, to yield a useful spectrum $U_T(f)$;

in the time domain, determining an autocorrelation function $\widehat{ACF}(t)$ of the useful spectrum $U_T(f)$;

using a weighting function w(t) further comprising a Parzen window $w_P(t)$, the Parzen window including a notch, to suppress portions of the useful signal in the autocorrelation function $\widehat{ACF}(t)$, thereby intensifying the interfering signal in relation to the autocorrelation function $\widehat{ACF}(t)$;

Fourier transforming the resulting signal $\widehat{ACF}(t)$ into a power spectral density $\widehat{ACF}(f)$;

calculating, with a MADMED function, a threshold value m from the power spectral density $\widehat{ACF}(f)$;

calculating, with a comparator, an ideal notch filter frequency response $W_{N\ ideal}(f)$ from the power spectral density $\widehat{ACF}(f)$;

generating a final notch filter $W_N(f)$ by Fourier-transforming the ideal notch filter frequency response $W_{N\ ideal}(f)$ into an ideal notch filter pulse response $w_{N\ ideal}(t)$, multiplying the ideal notch filter pulse response $w_{N\ ideal}(t)$ by a Kaiser-Bessel window $w_F(t)$, and subsequently inverse Fourier-transforming the product $w_N(t)$ thereof into a notch filter frequency response $W_N(f)$;

multiplying the notch filter frequency response $W_N(f)$ by the useful spectrum $U_T(f)$; and Fourier-transforming a resulting spectrum $\tilde{U}_T(f)$ into the time domain to generate a noise-free radar signal $\tilde{u}_T(t)$.

2. A device for performing the process according to claim 1, comprising:

(a) a low-pass filter (10) performing low-pass filtering on the noisy raw data signal $\tilde{U}_T(t)$, and further comprising a first Fast Fourier Transform unit ($10_1$) Fourier transforming the raw data signal $\tilde{u}_T(t)$ to into the raw frequency-domain spectrum $\tilde{U}_T(f)$;

a low-pass filter function generator ($10_2$) generating a low-pass filter function $W_{TP}(f)$ in the frequency domain;

a first multiplier ($10_3$) in which the raw spectrum $\tilde{U}_T(f)$ is multiplied by the low-pass filter function $W_{TP}(f)$ to generate a time-limited useful spectrum $U_T(f)$;

(b) a detector device (20) emphasizing the interfering signal, further comprising a conjugate complex spectrum calculator ($20_1$) generating a conjugate complex spectrum $U^*_T(f)$ from the useful spectrum $U_T(f)$;

a second multiplier ($20_2$), in which a second product of the useful spectrum $U_T(f)$ and the conjugate complex spectrum $U^*_T(f)$ is calculated;

a first inverse Fast Fourier Transform unit ($20_3$) to produce the autocorrelation function $\widehat{ACF}(t)$ from the second product output from the second multiplier ($20_2$);

a weighting unit (21) further comprising an absolute-value unit ($21_1$) to calculate an absolute-value signal $\widehat{ACF}(t)$, a median filter ($21_2$) to calculate the smoothed signal $|\widehat{ACF}(t)|$ therefrom, an inverse-calculating unit ($21_3$), which calculates an inverted signal $1/|\widehat{ACF}(t)|$ of the smoothed signal $|\widehat{ACF}(t)|$, a third multiplier ($21_4$), which calculates a quotient $w'(t)=\widehat{ACF}(t)/|\widehat{ACF}(t)|$ by multiplying the inverted signal $1/|\widehat{ACF}(t)|$ and the smoothed signal $|\widehat{ACF}(t)|$, a fourth multiplier ($21_5$) accepting signals from the third multiplier ($21_4$) and from a generating unit ($21_6$) generating the Parzen window $w_P(t)$ and outputting therefrom a weighting function w(t);

a sixth multiplier ($20_6$), in which a third product $\widehat{ACF}(t)$ is formed from the autocorrelation function $\widehat{ACF}(t)$ and the weighting function w(t), whereby the step of using a weighting function is accomplished; and a second Fast Fourier Transform unit ($20_5$) to generate the power spectral density $\widehat{ACF}(f)$ from the third product $\widehat{ACF}(t)$; and (c) a detection device (30) for detection of interference peaks in the power spectral density $\widehat{ACF}(f)$, further comprising a MADMED unit ($30_1$) for calculating with the MADMED (function a MADMED value $U_{MADMED}$ from the power spectral density $\widehat{ACF}(f)$; and an amplifier ($30_2$) for generating the threshold value m from the MADMED value $U_{MADMED}$;

(e) a notch-filtering device (40) for notch filtering of the power spectral density $\widehat{ACF}(f)$, further comprising a comparator ($40_1$), to which the threshold value m and the power spectral density $\widehat{ACF}(f)$ are input, the comparator outputting a value one when the input signal $\widehat{ACF}(f)$ is greater than m and outputting a value zero otherwise, whereby the ideal notch filter $W_{N\ ideal}(f)$ is generated;

a second inverse Fast Fourier Transform unit ($40_2$) to generate a notch filter pulse response $w_{N\ ideal}(t)$ from the ideal notch filter frequency response $W_{N\ ideal}(f)$;

a Kaiser-Bessel window generator ($40_3$) for generating a Kaiser-Bessel window $w_F(t)$;

a seventh multiplier ($40_4$), in which a fourth product $w_N(t)$ is generated from the notch filter pulse response $w_{N\ ideal}(t)$ and the Kaiser-Bessel window $w_F(t)$;

a third Fast Fourier Transform unit ($40_5$) transforming the fourth product $w_N(t)$ into a notch filter function $W_N(f)$ in the frequency domain;

an eighth multiplier ($40_6$), in which a fifth product $\tilde{U}_T(f)$ is generated from the time-limited useful product $U_T(f)$ and the notch filter function $W_N(f)$; and a third inverse Fast Fourier Transform unit ($40_7$) to transform the fifth product into the time domain, whereby the noise-free radar signal $\tilde{u}_T(t)$ is generated.

* * * * *